US012626921B2

(12) United States Patent
In et al.

(10) Patent No.: US 12,626,921 B2
(45) Date of Patent: May 12, 2026

(54) CARBON ELECTRODE FOR DYE-SENSITIZED BETAVOLTAIC BATTERIES, BETAVOLTAIC BATTERY INCLUDING THE SAME, AND METHOD OF MANUFACTURING THE SAME

(71) Applicant: DAEGU GYEONGBUK INSTITUTE OF SCIENCE AND TECHNOLOGY, Daegu (KR)

(72) Inventors: Su Il In, Daegu (KR); Yun Ju Hwang, Seoul (KR); Dae Hee Kim, Daegu (KR); Young Ho Park, Daegu (KR); Hong Soo Kim, Daegu (KR)

(73) Assignee: Daegu Gyeongbuk Institute of Science and Technology, Daegu (KR)

(*) Notice: Subject to any disclaimer, the term of this patent is extended or adjusted under 35 U.S.C. 154(b) by 851 days.

(21) Appl. No.: 17/789,453

(22) PCT Filed: Nov. 17, 2020

(86) PCT No.: PCT/KR2020/016165
§ 371 (c)(1),
(2) Date: Jun. 27, 2022

(87) PCT Pub. No.: WO2021/132890
PCT Pub. Date: Jul. 1, 2021

(65) Prior Publication Data

US 2023/0090218 A1 Mar. 23, 2023

(30) Foreign Application Priority Data

Dec. 27, 2019 (KR) ........................ 10-2019-0176784

(51) Int. Cl.
*H01M 4/583* (2010.01)
*G21H 1/04* (2006.01)
(Continued)

(52) U.S. Cl.
CPC .............. *H01M 4/583* (2013.01); *G21H 1/04* (2013.01); *H01M 4/48* (2013.01); *H01M 4/66* (2013.01);
(Continued)

(58) Field of Classification Search
CPC .......... H01M 4/583; H01M 4/48; H01M 4/66; H01M 2004/027; H01M 2004/028;
(Continued)

(56) References Cited

U.S. PATENT DOCUMENTS 5,859,484 A 1/1999 Mannik et al.
10,083,770 B2 9/2018 Kwon et al.
(Continued)

FOREIGN PATENT DOCUMENTS

CN 103107287 A * 5/2013
CN 107945901 A * 4/2018 ............... G21H 1/04
(Continued)

OTHER PUBLICATIONS

Chen et al. (CN 107945901 A and using Machine Translation as English version) (Year: 2018).*
(Continued)

*Primary Examiner* — Milton I Cano
*Assistant Examiner* — Joshua P McClure
(74) *Attorney, Agent, or Firm* — HARNESS, DICKEY & PIERCE, P.L.C.

(57) ABSTRACT

The present invention relates to a betavoltaic battery and a method of manufacturing the same. More specifically, the present invention relates to a betavoltaic battery characterized in that $^{14}C$, a radioisotope, is formed in the form of quantum dots and $^{14}C$ is used as the cathode and the beta-ray source of the betavoltaic battery and a method of manufacturing the betavoltaic battery.

8 Claims, 13 Drawing Sheets

(51) Int. Cl.
*H01M 4/48* (2010.01)
*H01M 4/66* (2006.01)
*H01M 4/02* (2006.01)

(52) U.S. Cl.
CPC ................. *H01M 2004/027* (2013.01); *H01M 2004/028* (2013.01)

(58) Field of Classification Search
CPC ...... H01M 4/04; H01M 4/0471; H01M 4/622; G21H 1/04; Y02E 10/542
See application file for complete search history.

(56) References Cited

U.S. PATENT DOCUMENTS

| | | | |
|---|---|---|---|
| 2006/0261325 A1 | 11/2006 | Zanrosso et al. | |
| 2018/0065095 A1* | 3/2018 | Ardo | C02F 1/4693 |
| 2018/0182562 A1* | 6/2018 | Alghamdi | H01G 9/2059 |

FOREIGN PATENT DOCUMENTS

| | | |
|---|---|---|
| EP | 00622811 A1 | 11/1994 |
| JP | 6085880 B2 | 3/2017 |
| KR | 10-1458784 B | 11/2014 |
| KR | 101820807 B1 | 1/2018 |
| KR | 101838507 B1 | 3/2018 |
| KR | 10-2019-0053126 A | 5/2019 |

OTHER PUBLICATIONS

Weimin et al. (CN103107287 A and using Machine Translation as English version) (Year: 2013).*

Yiyang Chang et al., "A betavoltaic microcell based on Au/s-SWCNTs/Ti Schottky junction" In: Sensors and Actuators A: Physical, Aug. 15, 2014, vol. 215 (2013).

Bong Yoo et al., "Conceptual Design to Increase Power of Betavoltaic Battery using Ni-63 Beta Radioisotope and Semiconductor" DBPIA (2010).

Na Wang et al., "Defect-induced betavolatic enhancement in black titania nanotube arrays" Nanoscale, vol. 10 (2018).

KR Notice of Allowance dated Feb. 10, 2022.

International Search Report PCT/ISA/210 and Written Opinion PCT/ISA/237 for International Application No. PCT/KR2020/016165 dated Feb. 25, 2021.

Priority Document KR Patent Application No. 10-2019-0176784.

* cited by examiner

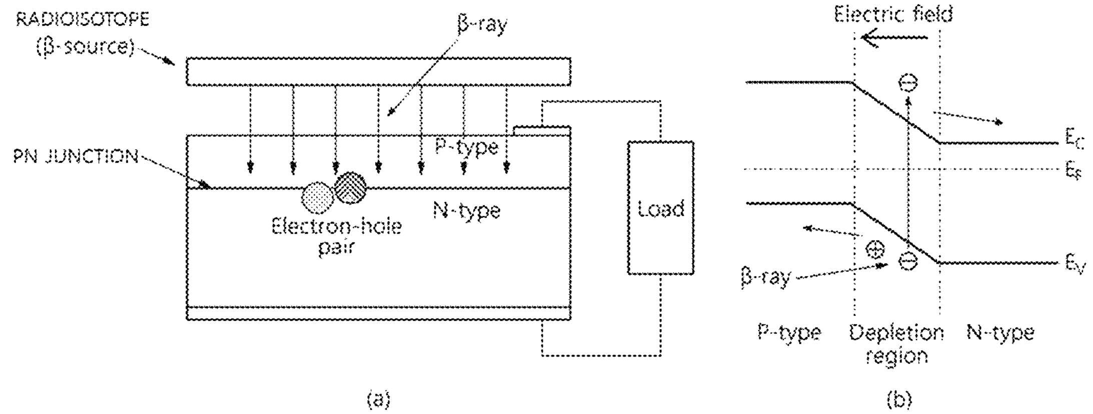
[FIG. 1]
RADIOISOTOPE
(β-source)
β-ray
PN JUNCTION
P-type
N-type
Load
Electron-hole
pair
(a)
Electric field
$E_C$
$E_f$
$E_V$
β-ray
P-type    Depletion    N-type
region
(b)
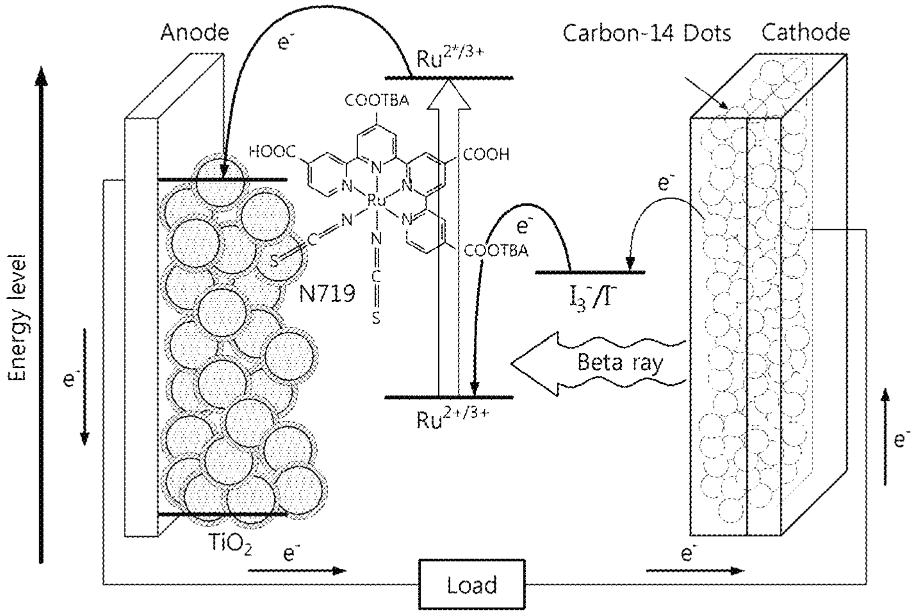
[FIG. 2]
Anode
$e^-$
$Ru^{2+/3+}$
Carbon-14 Dots    Cathode
COOTBA
HOOC
COOH
Energy level
$e^-$
N719
COOTBA
$e^-$
$e^-$
$I_3^-/I^-$
$Ru^{2+/3+}$
Beta ray
$e^-$
$TiO_2$
$e^-$
$e^-$
Load
$e^-$

[FIG. 3A]
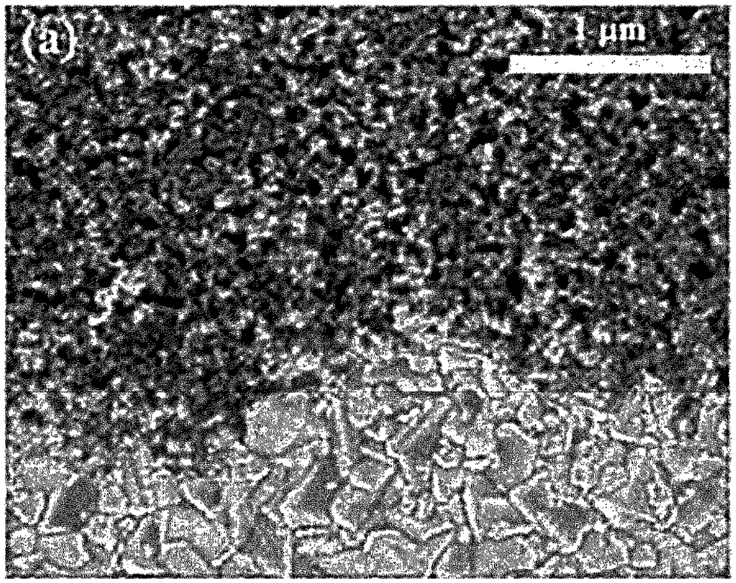
[FIG. 3B]
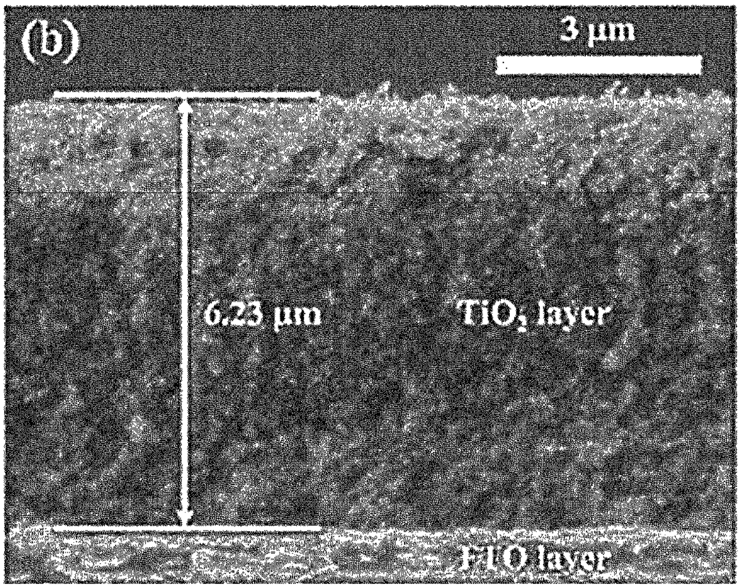

[FIG. 4A]
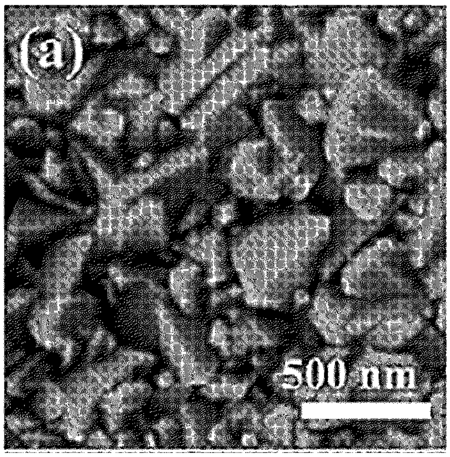
[FIG. 4B]
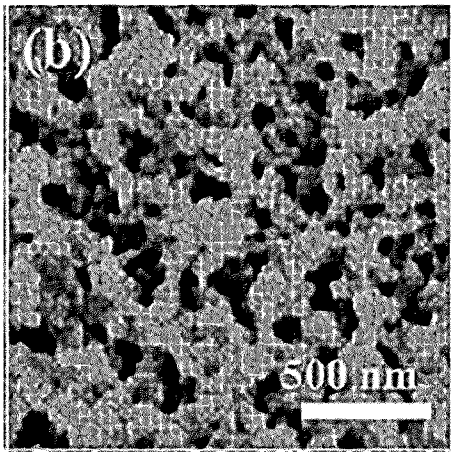
[FIG. 4C]
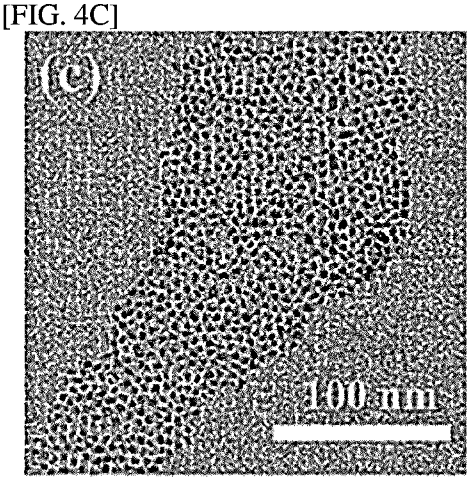

[FIG. 4D]
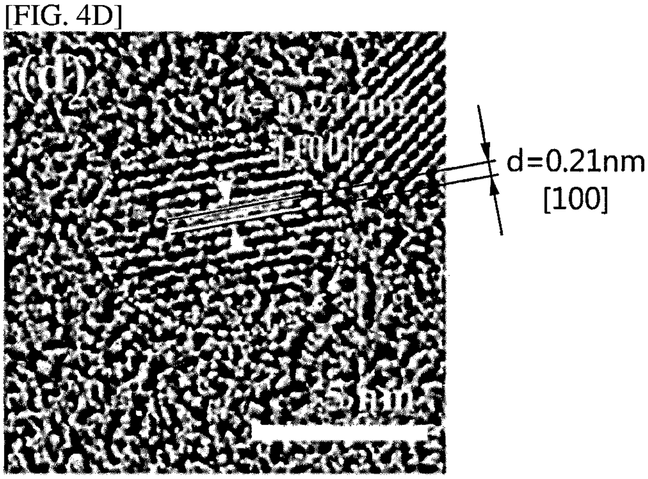
[FIG. 5A]
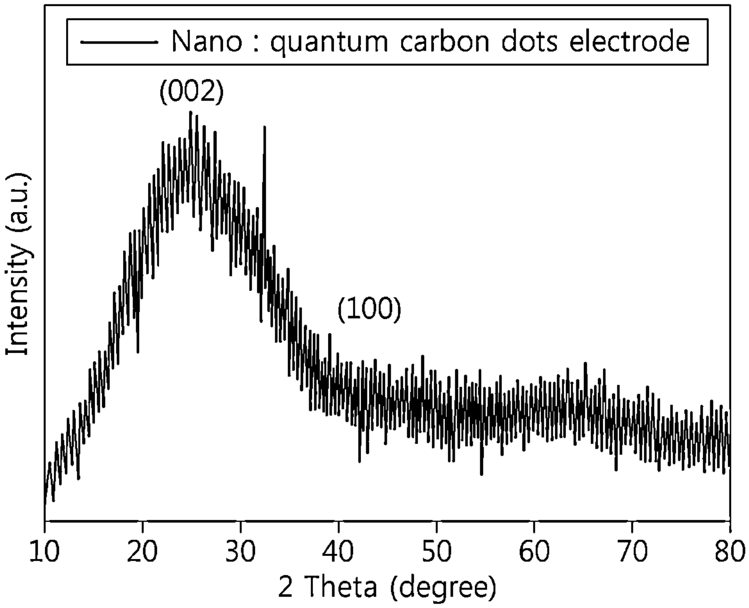

[FIG. 5B]
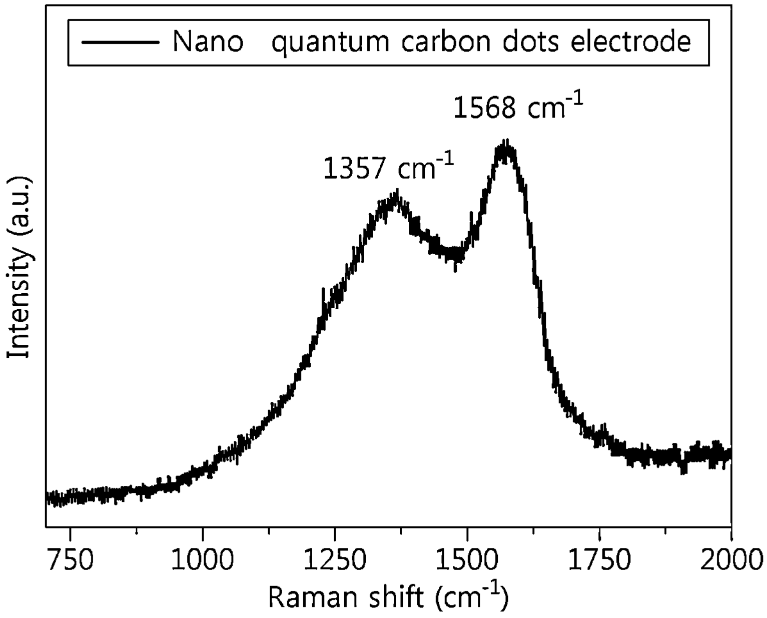
[FIG. 6A]
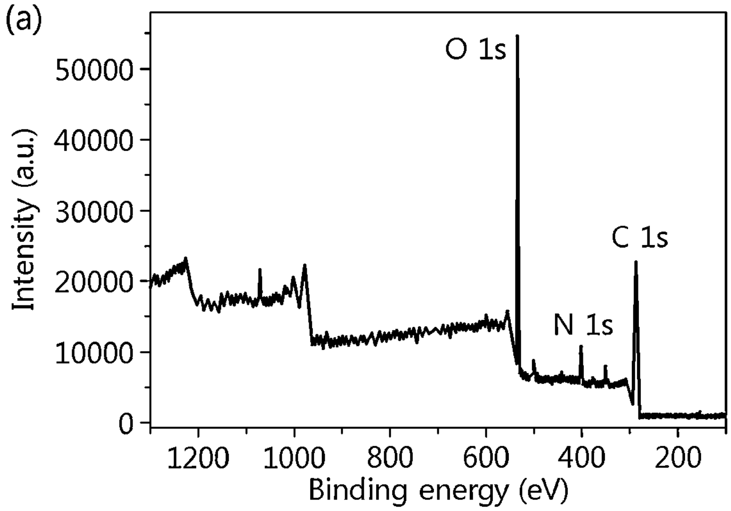

[FIG. 6B]
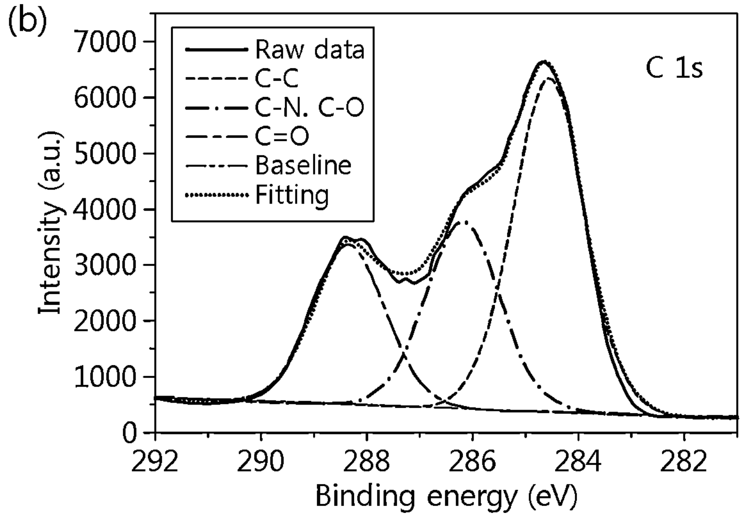
[FIG. 6C]
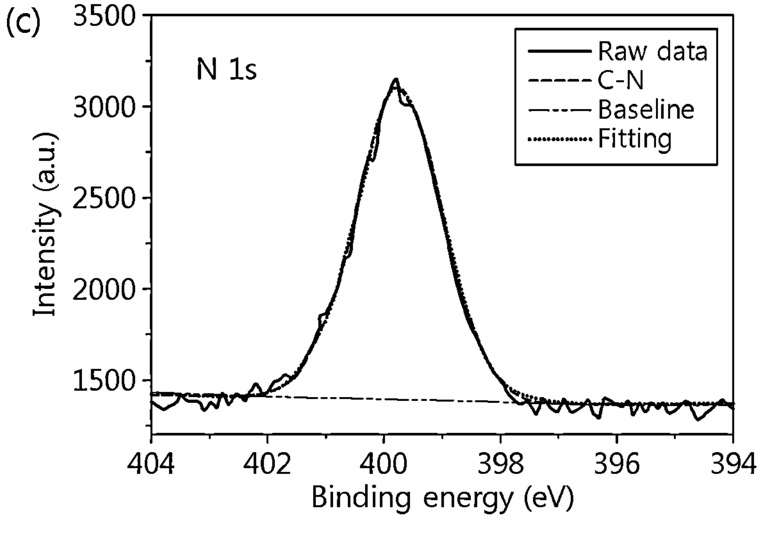

[FIG. 6D]
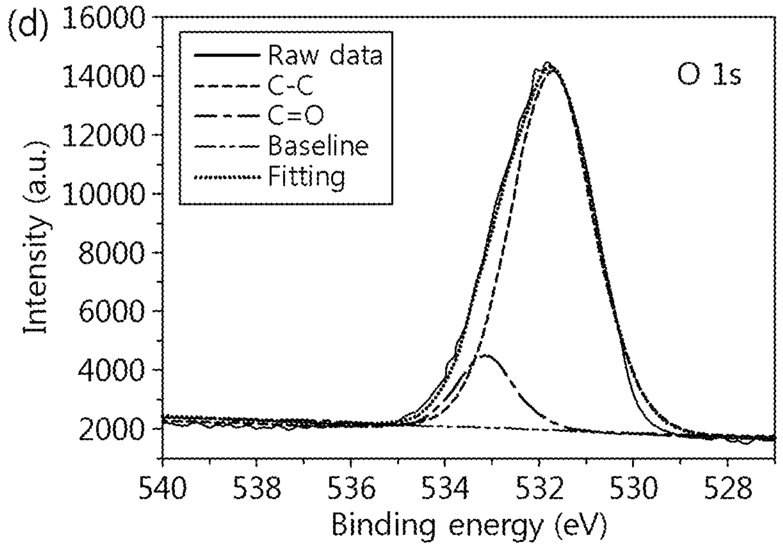
[FIG. 7A]
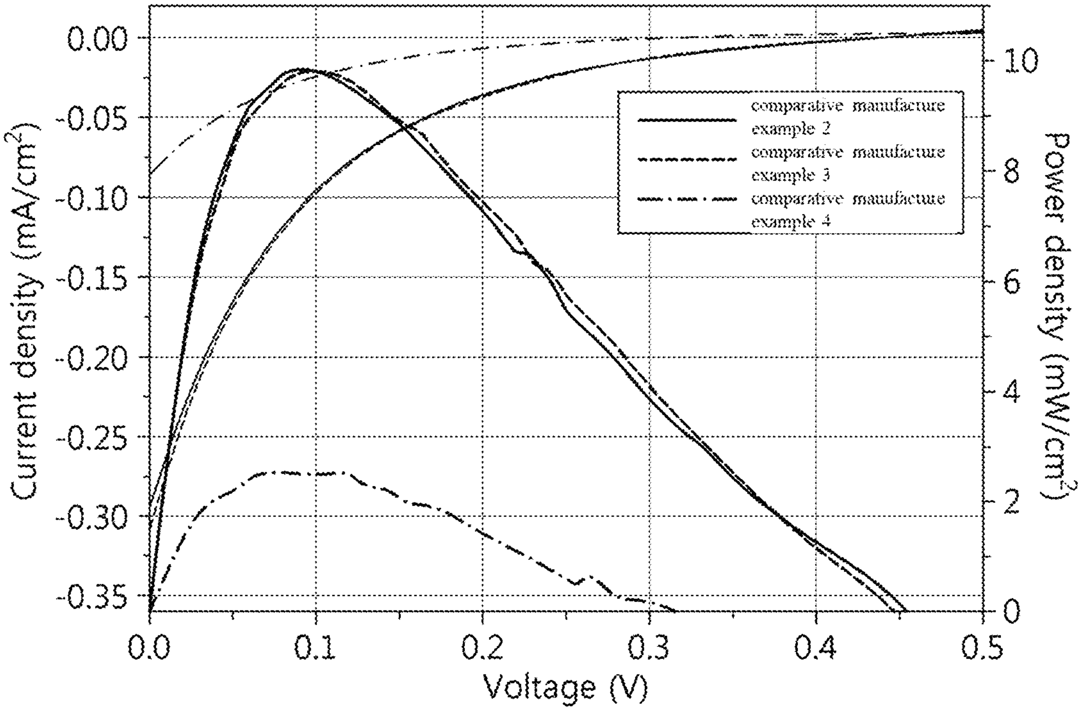

[FIG. 7B]
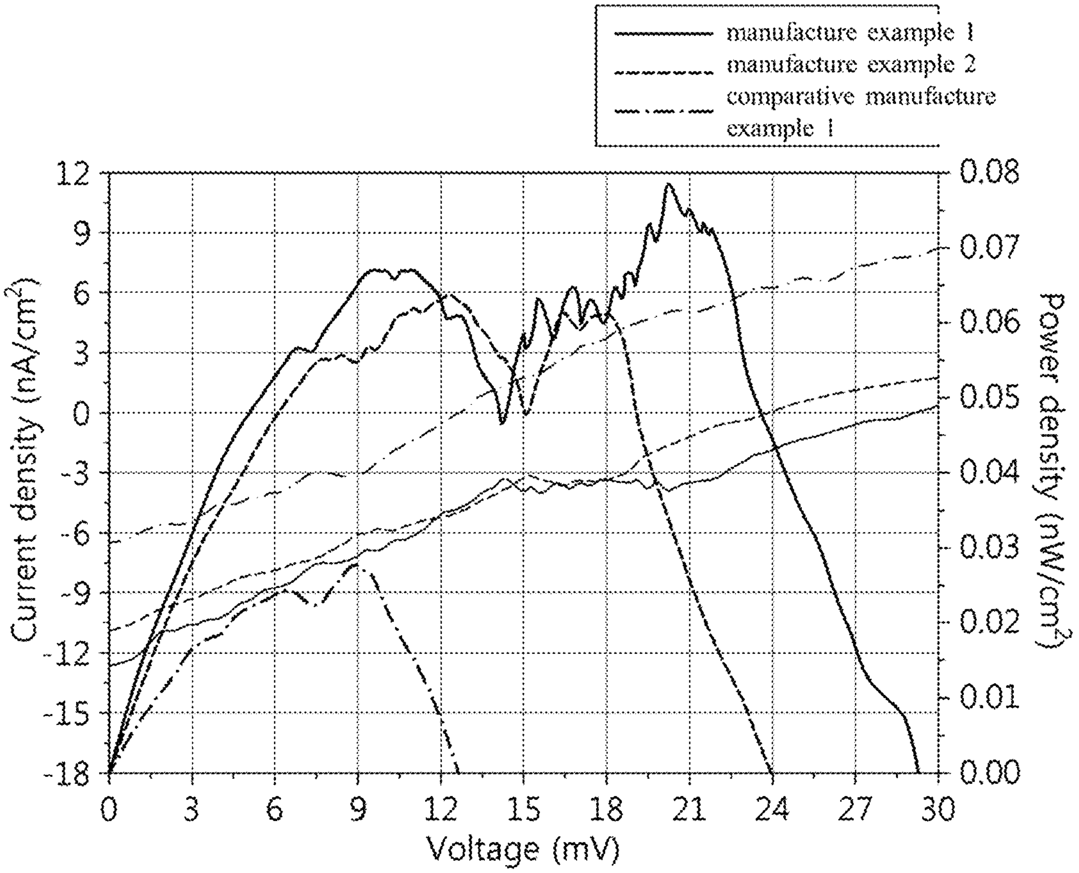
[FIG. 7C]
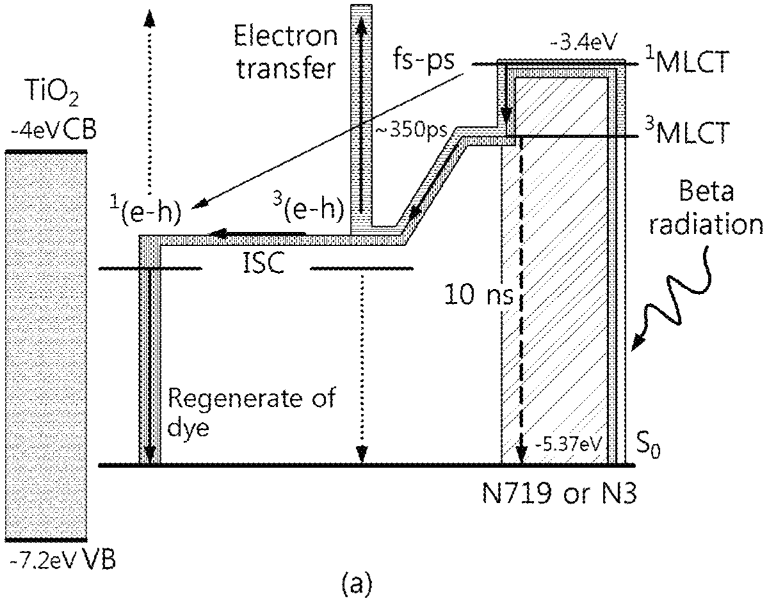
(a)

[FIG. 7D]
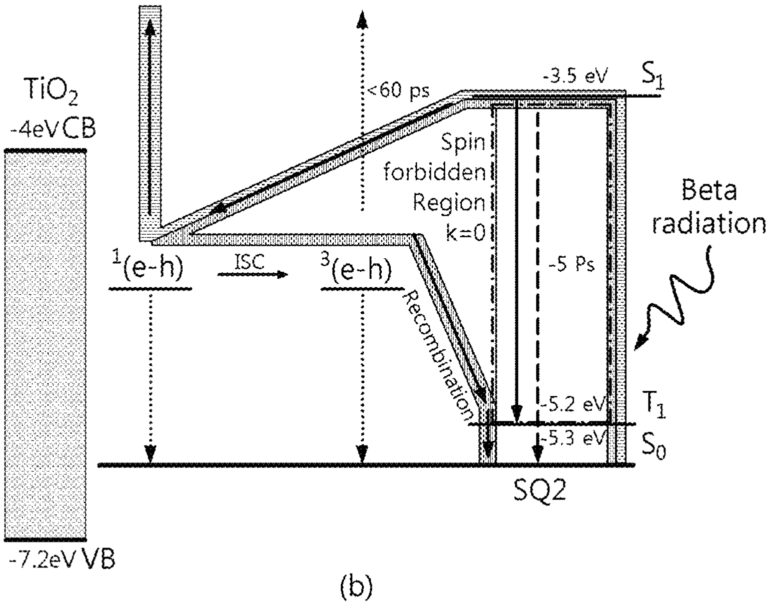
(b)
[FIG. 8A]
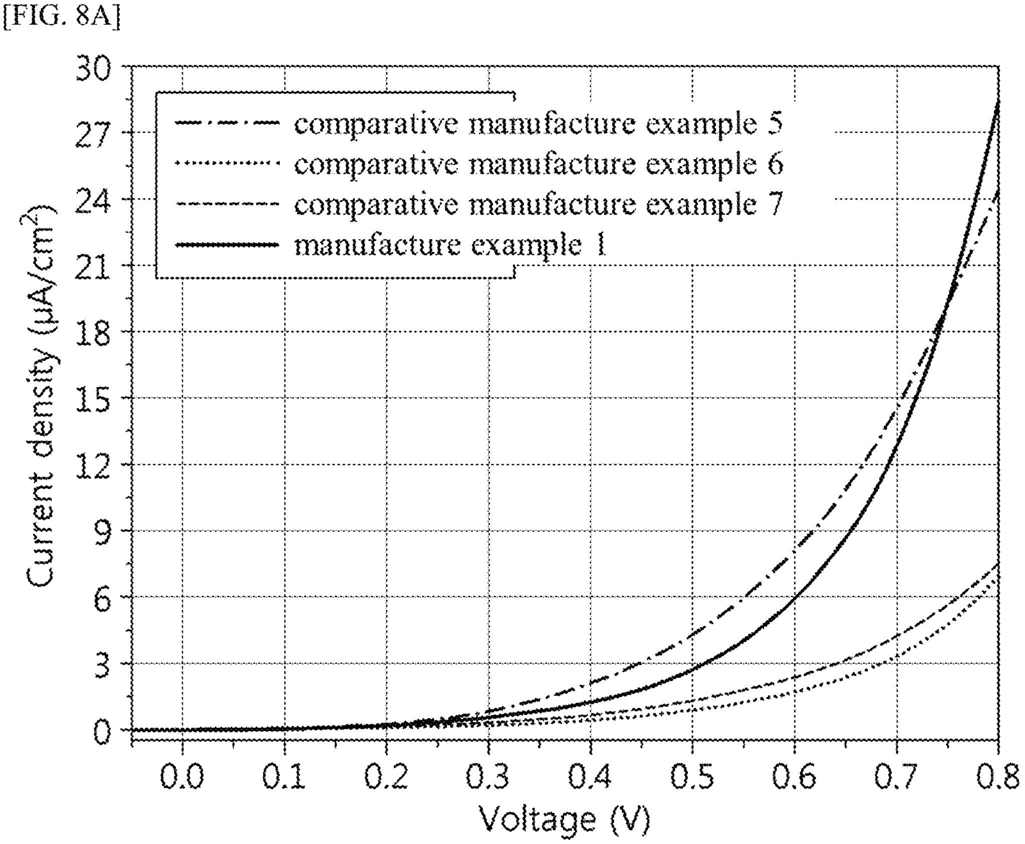

[FIG. 8B]
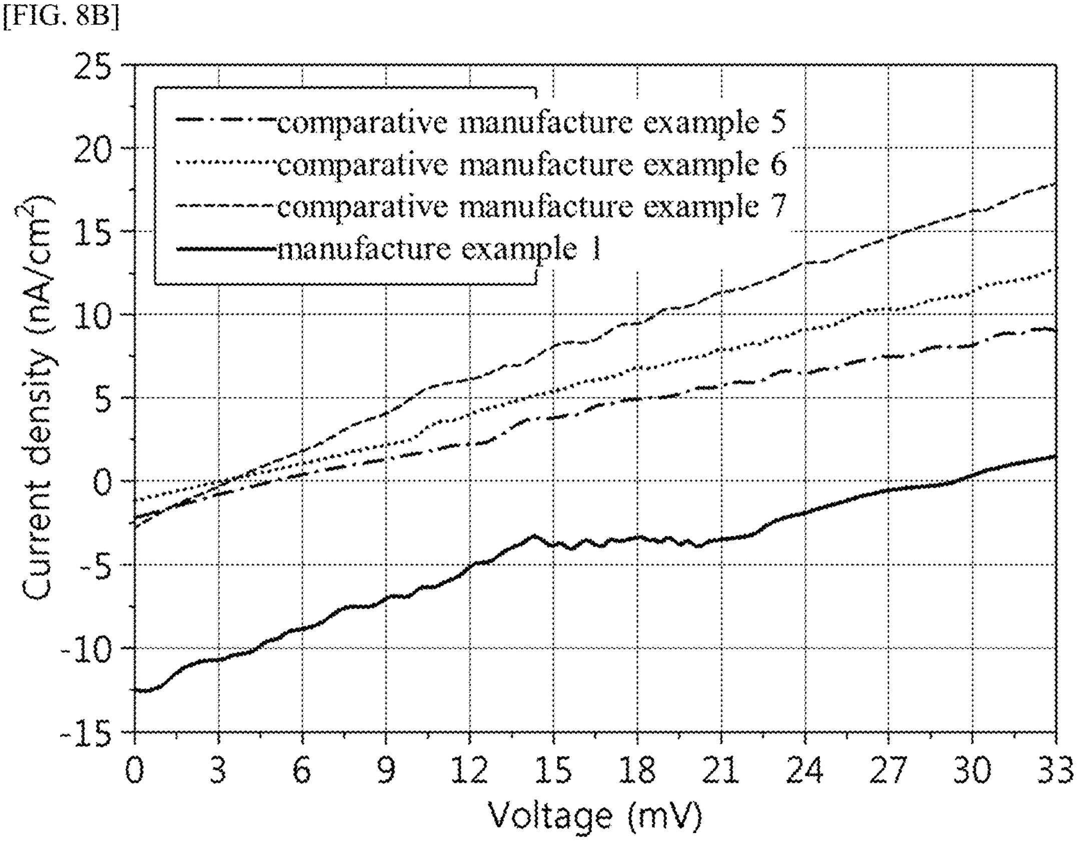

[FIG. 8C]
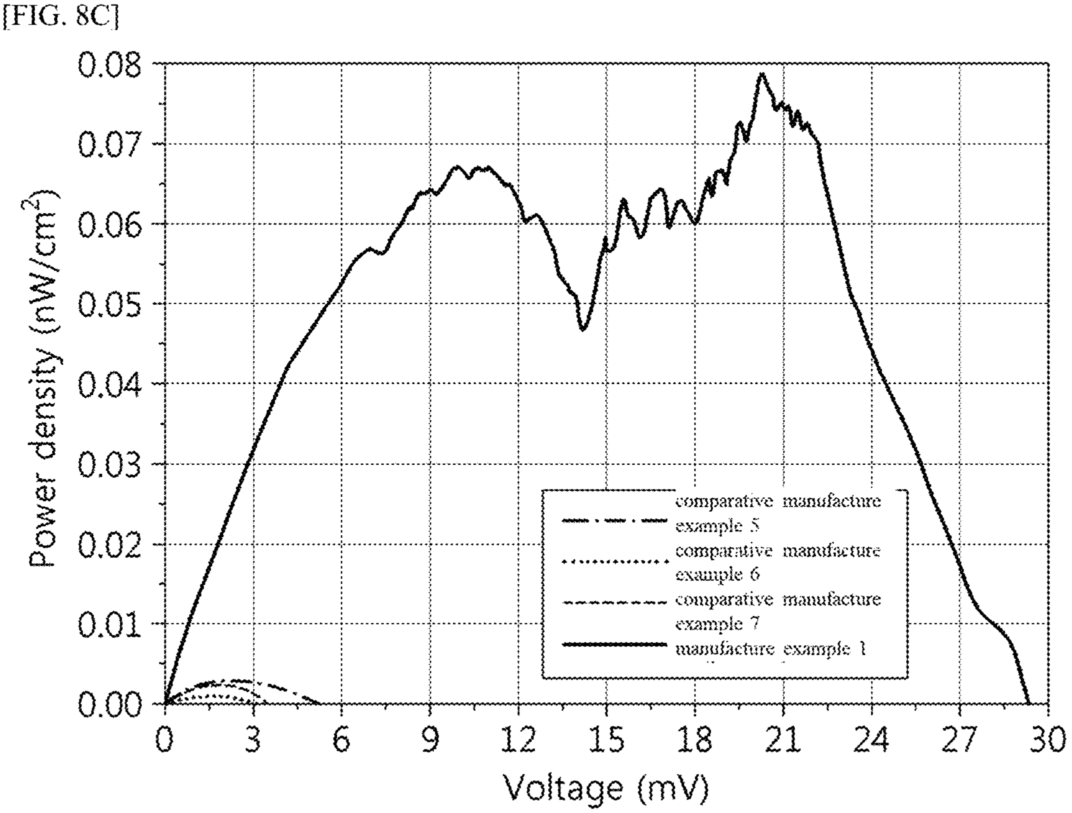
[FIG. 9A]
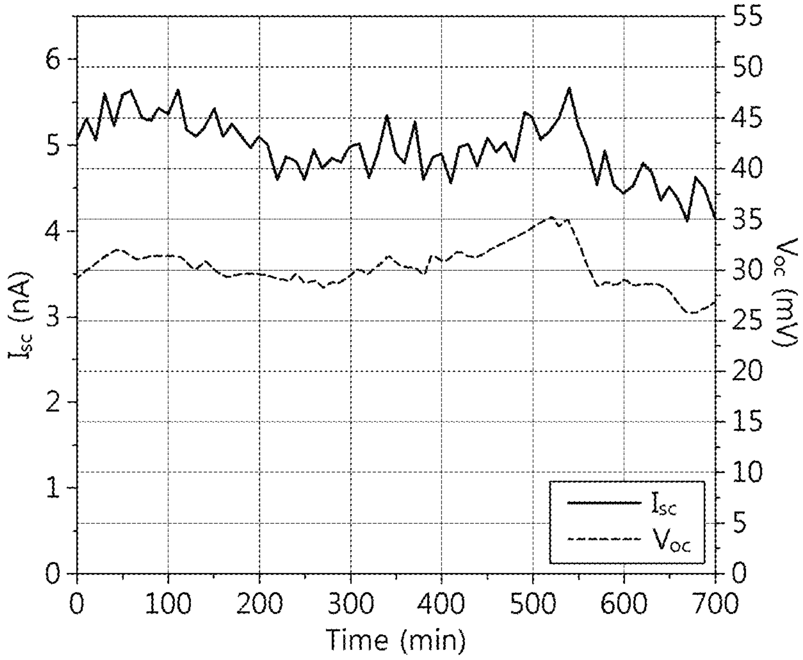

[FIG. 9B]
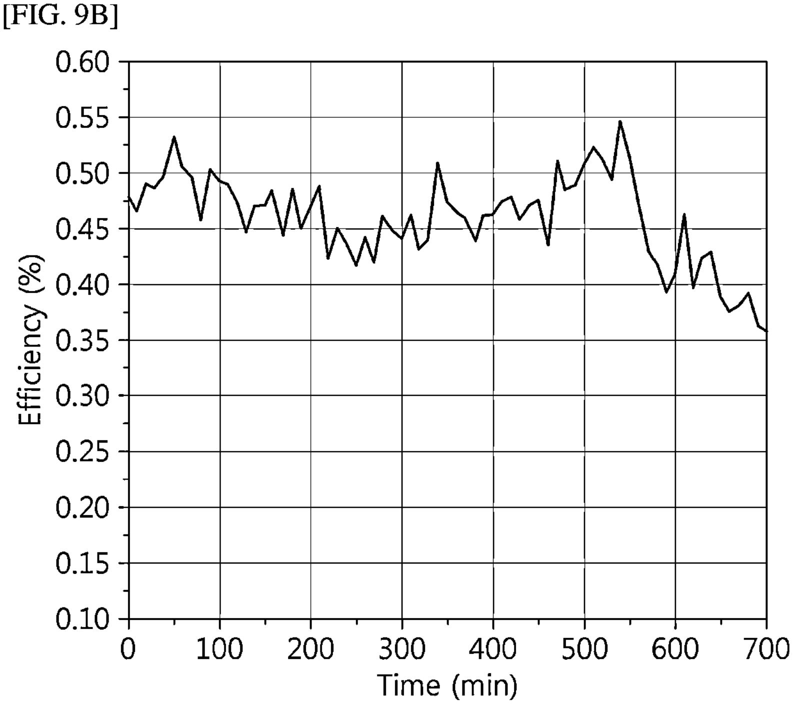

[FIG. 10]
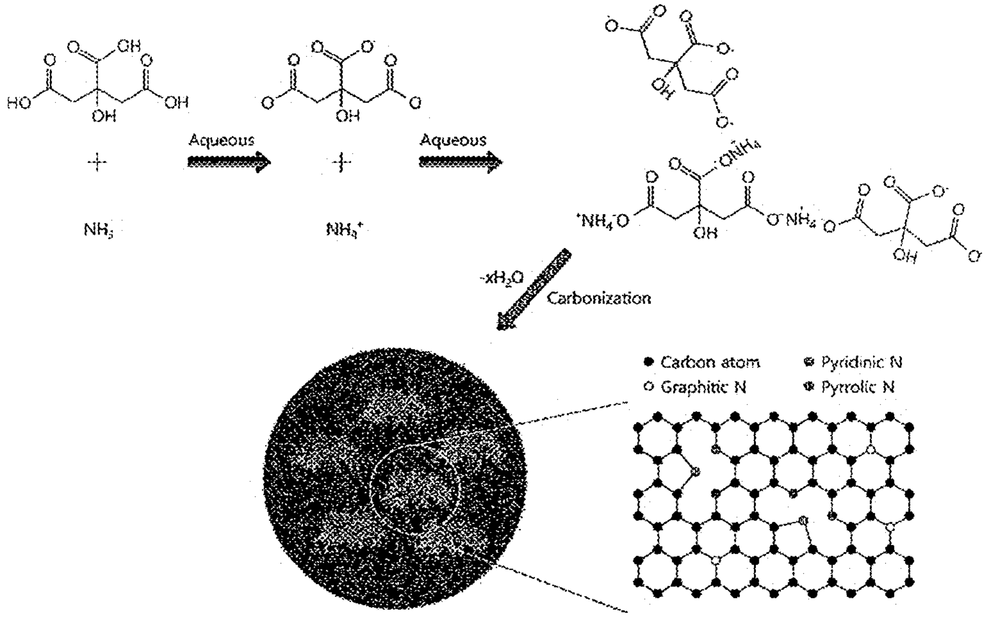

CARBON ELECTRODE FOR DYE-SENSITIZED BETAVOLTAIC BATTERIES, BETAVOLTAIC BATTERY INCLUDING THE SAME, AND METHOD OF MANUFACTURING THE SAME

CROSS-REFERENCE TO RELATED APPLICATIONS

This application is a national phase under 35 U.S.C. § 371 of PCT International Application No. PCT/KR2020/016165 which has an International filing date of Nov. 17, 2020, which claims priority to Korean Patent Application No. 10-2019-0176784, filed Dec. 27, 2019, the entire contents of each of which are hereby incorporated by reference.

TECHNICAL FIELD

The present invention relates to a carbon electrode (or cathode) for betavoltaic batteries including $^{14}C$ quantum dots, which are radioisotopes, a betavoltaic battery using the carbon electrode as a beta-ray source, and a method of manufacturing the carbon electrode.

BACKGROUND ART

A betavoltaic battery is an isotope battery that absorbs, through the surface of a PN junction semiconductor, beta rays from radioisotopes that emit beta particles (electrons) and converts the beta rays into electrical energy. According to the operating principle of the betavoltaic battery, beta rays emitted from a beta-ray source generate electron-hole pairs in a space charge region in a PN junction semiconductor, and the generated carriers have the voltage and current characteristics of the betavoltaic battery (see FIG. 1). Table 1 below shows the half-life and average energy of each type of isotope emitting pure beta rays.

Depending on nuclides, radioisotopes emitting beta particles have energy spectra ranging from a few eV to hundreds of keV and intrinsic maximum and average energy values. When a nuclide having a long half-life is used, the output life of a betavoltaic battery is increased. However, due to the long half-life, decay rate may be reduced, which may reduce output power. Accordingly, it is necessary to implement a betavoltaic battery suitable for intended use by appropriately selecting half-life and energy. Using the characteristics of isotope batteries with a long half-life and high energy density, betavoltaic batteries may be used as micro-power sources for sensors used in the polar regions, a remote area, or a space that are out of reach of humans for a long time or micro-power sources for military sensors.

TABLE 1

| Beta-ray emitting nuclides | Half-life | Average energy (keV) |
|---|---|---|
| Ni-63 | 100.2 y | 17.4 |
| H-3 | 12.3 y | 5.7 |
| Pm-147 | 2.6 y | 62.0 |
| Sr-90 | 28.8 y | 195.8 |
| Ca-45 | 162 y | 256.0 |

In a betavoltaic battery, the efficiency of kinetic energy of beta particles may vary depending on the structure thereof. For example, in the case of a planar structure PN junction, since a radiation source is located on the top of the PN junction, beta particles emitted in four directions from the side and beta particles emitted upwards are dissipated without being converted into electric power. As another example, when a radiation source is placed between a p-type semiconductor and an n-type semiconductor, excitons by beta particles are effectively separated. However, as the thickness of a material containing the radiation source increases, the number of recombination electrons and holes increases. In addition, as the thickness of the material decreases, the amount of the radiation source contained in the material decreases. The above two examples have a disadvantage in that the amount of current per unit area is small due to a small surface area.

In such a conventional PN semiconductor-type betavoltaic battery, a beta-ray source and an energy absorber are in direct contact with each other, and emitted beta electrons collide with the absorber. Accordingly, when used for a long period of time, the absorber is damaged, which causes current loss, making it difficult to continuously generate current. In addition, in the conventional betavoltaic battery, a radioisotope in the initial form thereof is used without changing the form of the radioisotope. In addition, since the structure of a battery (or cell) is limited depending on the type of radioisotope source, there is a problem in that the amount of energy that can be used is limited.

DISCLOSURE

Technical Problem

Therefore, the present invention has been made in view of the above problems, and it is one object of the present invention to provide a structure of a novel betavoltaic battery characterized in that the density of radiation energy within the same surface area is improved by forming a radioisotope in the form of quantum dots as a beta-ray source and introducing the radioisotope as an electrode and a beta-ray source, and a dye, not a semiconductor, is used as the energy absorber of the beta-ray source.

Technical Solution

In accordance with one aspect of the present invention, provided is a carbon electrode for betavoltaic batteries including a support layer including a conductive substrate; and a beta-ray source emission layer including organic carbon quantum dots including $^{14}C$ formed on the support layer.

As a preferred example of the present invention, the conductive substrate constituting the support layer may include one or more selected from fluorine tin oxide (FTO) glass, indium tin oxide (ITO) glass, indium zinc oxide (IZO) glass, aluminum zinc oxide (AZO) glass, and gallium zinc oxide (GZO) glass.

As a preferred example of the present invention, the organic carbon quantum dots may include a fired product obtained by firing a polymer of a compound represented by Chemical Formula 2 below and quaternary ammonium ions (or carbide):

[Chemical Formula 2]

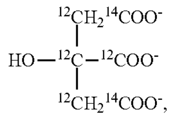

wherein $^{14}C$ represents a radioisotope of carbon.

As a preferred example of the present invention, the organic carbon quantum dots may have a particle diameter of 4 nm to 20 nm.

In accordance with another aspect of the present invention, provided is a method of manufacturing the carbon electrode for betavoltaic batteries described above, the method including Step 1 of preparing a mixed solution containing an organic acid represented by Chemical Formula 1 below and an aqueous ethanol solution; Step 2 of preparing a carbon precursor solution by mixing the mixed solution and aqueous ammonia; Step 3 of coating an upper portion of a conductive substrate with the carbon precursor solution; and Step 4 of drying the conductive substrate coated with the carbon precursor solution and then performing a firing process:

[Chemical Formula 1]

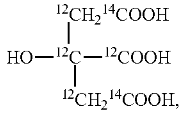

wherein $^{14}C$ represents a radioisotope of carbon.

As a preferred example of the present invention, the aqueous ethanol solution of Step 1 may be an aqueous ethanol solution having a concentration of 88.0 to 99.9% by volume.

As a preferred example of the present invention, based on a volume ratio of 100 of the mixed solution, the carbon precursor solution of Step 2 may include aqueous ammonia in a volume ratio of 5 to 20.

As a preferred example of the present invention, in Step 4, firing may be performed at 140 to 300° C. for 2 to 8 hours.

In accordance with yet another aspect of the present invention, provided is a betavoltaic battery including, as a cathode, the carbon electrode for betavoltaic batteries described above.

As a preferred example of the present invention, the betavoltaic battery of the present invention includes an anode; a cathode disposed opposite the anode; and an electrolyte, wherein the anode and the cathode are bonded via an encapsulant, a space filled with the electrolyte is formed between the anode and the cathode, the space is filled with the electrolyte, and the cathode includes the carbon electrode for betavoltaic batteries described above.

As a preferred example of the present invention, the anode may include a support layer including a conductive substrate; and a $TiO_2$ layer onto which a ruthenium-based dye is adsorbed formed on one surface of the support layer.

As a preferred example of the present invention, the $TiO_2$ layer onto which a ruthenium-based dye is adsorbed may have an average thickness of 2 μm to 25 μm.

Advantageous Effects

In the betavoltaic battery of the present invention, a carbon electrode used as a cathode has a very high radiation energy density, and thus the emission amount of a beta-ray source is very high. In addition, by using a $TiO_2$ electrode to which a Ru-based dye is adsorbed as the energy absorber (anode) of the betavoltaic battery, the number of generated electrons is large compared to input energy, and thus energy production effect is very excellent.

DESCRIPTION OF DRAWINGS

FIGS. 1A and 1B are concept diagrams for explaining a conventional PN semiconductor-type betavoltaic battery.

FIG. 2 is a concept diagram for explaining a betavoltaic battery manufactured in Manufacture Example 1.

FIGS. 3A and 3B include SEM images of a $TiO_2$ electrode manufactured in Example 1 to which an Ru dye is adsorbed, FIG. 3A is a top image of the electrode, and FIG. 3B is a side image of the electrode.

FIGS. 4A to 4D includes high-resolution transmission electron microscope (FE-TEM) images of a carbon electrode composed of $^{14}C$ quantum dots manufactured in Example 2, FIG. 4A is a surface image of FTO glass, FIGS. 4B to 4D are surface images of a carbon electrode formed on the FTO glass, and 4B to 4D images have different magnifications.

FIGS. 5A and 5B show the results of XRD analysis and Raman analysis of the carbon electrode of Example 2 measured in Experimental Example 1.

FIGS. 6A to 6D show the results of XPS analysis of the carbon electrode of Example 2 measured in Experimental Example 2.

FIG. 7A shows measurement results for solar simulators including anodes (Examples 1-1 to 1-2 and Comparative Example 1-1) manufactured using different dyes and the carbon electrode of Comparative Example 2-1 manufactured using $^{12}C$ citric acid as a cathode, and FIG. 7B shows measurement results for solar simulators including anodes (Examples 1-1 to 1-2 and Comparative Example 1-1) manufactured using different dyes and the carbon electrode of Example 2-1 manufactured using $^{14}C$ citric acid as a cathode.

FIGS. 7C and 7D include schematic diagrams of the electron transfer mechanism and band alignment of a betavoltaic battery.

FIGS. 8A to 8C show the results of measuring the efficiency of the betavoltaic batteries of Manufacture Example 1, Comparative Manufacture Example 5, Comparative Manufacture Example 6, and Comparative Manufacture Example 7 performed in Experimental Example 5.

FIGS. 9A and 9B show the results of measuring the operational stability of the betavoltaic battery manufactured in Manufacture Example 1, FIG. 9A is a graph showing current ($I_{sc}$) and voltages ($V_{oc}$) according to operation time, and FIG. 9B is a graph showing change in the efficiency of the betavoltaic battery manufactured using the ruthenium-based dye represented by Chemical Formula 3 according to operating time.

FIG. 10 shows a reaction for forming organic carbon quantum dots according to an example.

BEST MODE

Hereinafter, the present invention will be described in detail.

A carbon electrode for betavoltaic batteries of the present invention includes a support layer; and a beta-ray source emission layer formed on the support layer.

The support layer includes a conductive substrate, preferably includes a conductive substrate including one or more selected from fluorine tin oxide (FTO) glass, indium tin oxide (ITO) glass, indium zinc oxide (IZO) glass, aluminum zinc oxide (AZO) glass, and gallium zinc oxide (GZO) glass, more preferably includes a conductive substrate including one or more selected from FTO glass, ITO glass, and IZO.

The beta-ray source emission layer may include organic carbon quantum dots including $^{14}C$ and may include a fired product obtained by firing a polymer of a compound represented by Chemical Formula 2 below and quaternary ammonium ions (or carbide). The quaternary ammonium ions may include one or more selected from $NH_4^+$, $NRH_3^+$, $NR_2H_2^+$, and $NR_3H^+$, preferably includes one or more selected from $NH_4^+$, $NRH_3^+$, and $NR_2H_2^+$, more preferably include one or more selected from $NH_4^+$ and $NRH_3^+$. In addition, in the quaternary ammonium ions, R is an alkyl group having 1 to 3 carbon atoms.

[Chemical Formula 2]

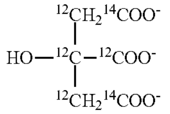

In Chemical Formula 2, $^{14}C$ represents a radioisotope of carbon.

The organic carbon quantum dots may have a particle diameter of 4 nm to 20 nm, preferably 4 nm to 15 nm, more preferably 4.5 nm to 10 nm. When the particle diameter of the organic carbon quantum dots is less than 4 nm, due to unstable shape thereof, the organic carbon quantum dots are vulnerable to heat, and thus have a short lifespan. Thus, the organic carbon quantum dots may be unsuitable as an electrode. When the particle diameter of the organic carbon quantum dots exceeds 20 nm, since the number of nanoparticles that enter the same area is limited, the amount of beta-ray source may decrease. Accordingly, it is preferable that the particle diameter is within the above range.

In addition, when the beta-ray source emission layer is formed, the thickness thereof may be adjusted according to the use of the betavoltaic battery.

The carbon electrode for betavoltaic batteries may be manufactured by performing a process including Step 1 of preparing a mixed solution containing an organic acid represented by Chemical Formula 1 below and an aqueous ethanol solution; Step 2 of preparing a carbon precursor solution by mixing the mixed solution and aqueous ammonia; Step 3 of coating an upper portion of a conductive substrate with the carbon precursor solution; and Step 4 of drying the conductive substrate coated with the carbon precursor solution and then performing a firing process.

[Chemical Formula 1]

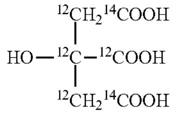

In Chemical Formula 1, $^{14}C$ represents a radioisotope of carbon.

The aqueous ethanol solution of Step 1 may be an aqueous ethanol solution having a concentration of 85.0 to 99.9% by volume, preferably an aqueous ethanol solution having a concentration of 88.0 to 99.9% by volume.

Next, aqueous ammonia of Step 2 serves to stabilize the surface of generated carbon nanoparticles. Based on a volume ratio of 100 of the mixed solution, the carbon precursor solution of Step 3 may include aqueous ammonia in a volume ratio of 5 to 20, preferably 5 to 17, more preferably 7 to 14. When the amount of aqueous ammonia is less than a volume ratio of 5, problems may arise in the condensation reaction of citric acid and ammonia. When the amount of aqueous ammonia exceeds a volume ratio of 20, the surface may be damaged due to loss of excess moisture during the reaction. Accordingly, it is preferable that the amount of aqueous ammonia is within the above range.

In addition, in Step 3, coating may be performed by applying the carbon precursor solution prepared in Step 3 onto one surface of the conductive substrate using a general coating method (bar coating, spray coating, drop coating, or the like). For example, coating may be performed by dropping the carbon precursor solution onto one surface of the conductive substrate dropwise.

Next, in Step 4, drying may be performed by a general drying method. As a preferred example, the conductive substrate coated with the carbon precursor solution may be dried on a hot plate.

In addition, in Step 4, firing (or carbonization) may be performed at 140° C. to 300° C. for 2 to 8 hours, preferably at 190° C. to 230° C. for 2 to 4 hours. When the firing temperature is less than 140° C., there may be a problem in that the nuclei of carbon nanoparticles are not properly formed. When the firing temperature exceeds 300° C., the size of the carbon nanoparticles rapidly increases, which may cause a problem by reducing the number of carboxyl groups around the carbon nanoparticles. In addition, when the firing time is less than 2 hours, nuclear-sized carbon nanoparticles may not be able to form and grow due to lack of energy required for the reaction. When the firing time exceeds 5 hours, carbon nanoparticles grow rapidly due to excessive energy, which results in generation of carbon nanoparticles having non-uniform sizes. Accordingly, it is preferable that firing is performed within the above temperature and time ranges.

For example, when Steps 2 to 4 are performed, organic carbon quantum dots are formed through reaction shown in FIG. 10 (expression of radioisotopes is omitted in FIG. 10). FIG. 10 is a preferred embodiment to help understanding of the present invention, but the present invention is not limited thereto.

The carbon electrode of the present invention may be used as the cathode of a betavoltaic battery.

The present invention may provide a betavoltaic battery using the above-described carbon electrode as a cathode. More specifically, as shown in the concept diagram of FIG. 2, the betavoltaic battery of the present invention may include an anode; a cathode disposed opposite the anode; and an electrolyte. The anode and the cathode may be bonded via an encapsulant, a space filled with the electrolyte may be formed between the anode and the cathode, and the space may be filled with the electrolyte.

Since a quantum dot layer of the carbon electrode used as a cathode is composed of organic carbon quantum dots including $^{14}C$, a beta-ray source is emitted from the quantum dot layer, and the emitted beta-ray source serves as an energy source of a betavoltaic battery.

As the anode, general anodes used in betavoltaic batteries may be used. Preferably, a $TiO_2$ electrode including a support layer including a conductive substrate; and a $TiO_2$ layer onto which a ruthenium-based dye is adsorbed formed on one surface of the support layer may be used as the anode.

The support layer of the $TiO_2$ electrode may include a conductive substrate, preferably a conductive substrate including one or more selected from fluorine tin oxide (FTO) glass, indium tin oxide (ITO) glass, indium zinc oxide (IZO) glass, aluminum zinc oxide (AZO) glass, and gallium zinc oxide (GZO), more preferably a conductive substrate including one or more selected from FTO glass, ITO glass, and IZO glass.

In addition, the ruthenium-based dye may include one or more selected from a ruthenium-based dye represented by Chemical Formula 3 below, a ruthenium-based dye represented by Chemical Formula 4 below, a ruthenium-based N749 dye, a ruthenium-based Z907 dye, and a ruthenium-based C106 dye.

[Chemical Formula 3]

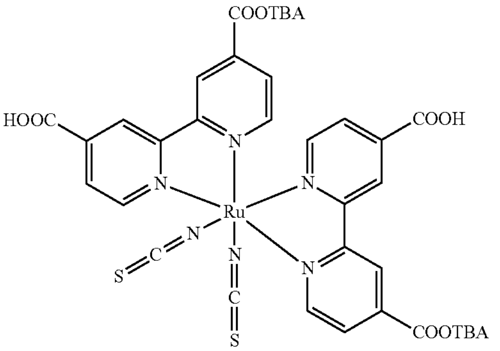

[Chemical Formula 4]

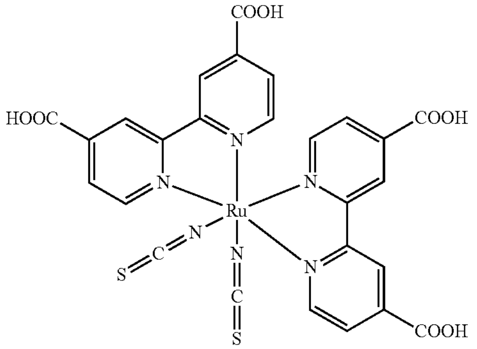

In addition, the $TiO_2$ layer onto which a ruthenium-based dye is adsorbed may have an average thickness of 2 μm to 25 μm, preferably 4 μm to 20 μm, more preferably 5 μm to 15 μm. When the dye-adsorbed $TiO_2$ layer has an average thickness of less than 2 μm or greater than 25 μm, electron transfer from a radioisotope emitting beta particles (electrons) may be not smooth. Accordingly, it is preferable to form the $TiO_2$ layer to have a thickness within the above range.

Hereinafter, the present invention will be described with reference to the following examples. At this time, the following examples are only presented to illustrate the invention, and the scope of the present invention is not limited by the following examples.

EXAMPLES

Example 1-1: Manufacture of Dye-Adsorbed $TiO_2$ Electrode

A pattern having a rectangular shape of 1.0 cm in width and 0.4 cm in length was formed in the center of washed FTO glass using 3M tape.

Next, $TiO_2$ paste was applied onto one surface of the FTO glass on which the pattern had been formed, and then the $TiO_2$ paste was dried at 70° C. to form a $TiO_2$ layer on the FTO glass (FTO-$TiO_2$).

Next, the dried FTO-$TiO_2$ was put into an electric furnace, the temperature was increased to 450° C. at a temperature increasing rate of 5° C./min, and firing was performed at 450° C. for 30 minutes.

Next, the fired FTO-$TiO_2$ was immersed in a dye solution containing a Ru-based dye represented by Chemical Formula 3 below for 24 hours to adsorb (coating) the dye inside and outside the $TiO_2$ layer.

[Chemical Formula 3]

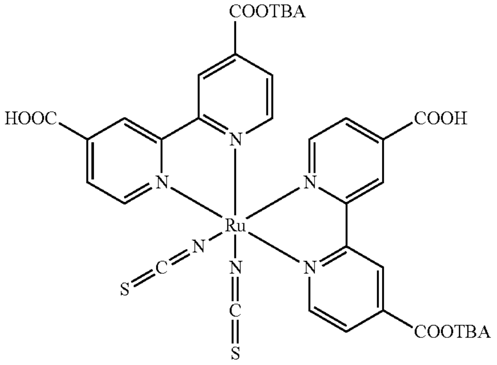

Next, after taking out the FTO-$TiO_2$ from the dye solution, the FTO-$TiO_2$ was washed with anhydrous alcohol (99.5%) as a washing solution to remove the dye solution and dried with an air gun to form a $TiO_2$ electrode.

The manufactured $TiO_2$ electrode was subjected to SEM analysis, and the results are shown in FIGS. 3A and 3B. FIG. 3A is a top image of the $TiO_2$ electrode, and FIG. 3B is a side image of the $TiO_2$ electrode.

Referring to FIG. 3B, it can be confirmed that the dye-adsorbed $TiO_2$ layer formed on the FTO glass has a thickness of about 6.23 μm.

Example 1-2

A dye-adsorbed $TiO_2$ having the same thickness was manufactured in the same manner as in Example 1-1, except that a ruthenium-based dye represented by Chemical Formula 4 below was used instead of the dye represented by Chemical Formula 3 to manufacture a dye-adsorbed $TiO_2$ electrode.

[Chemical Formula 4]

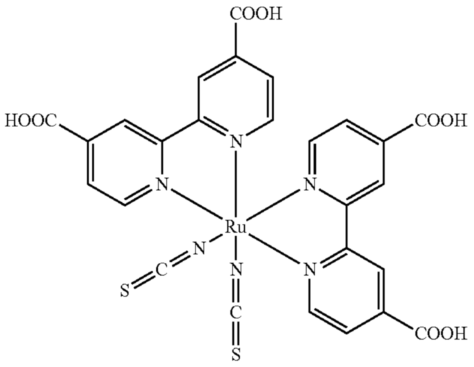

Comparative Example 1-1

A dye-adsorbed $TiO_2$ having the same thickness was manufactured in the same manner as in Example 1-1, except that an organic dye (SQ2 dye) represented by Chemical Formula 5 below was used instead of the ruthenium-based dye represented by Chemical Formula 3 to manufacture a dye-adsorbed $TiO_2$ electrode.

[Chemical Formula 5]

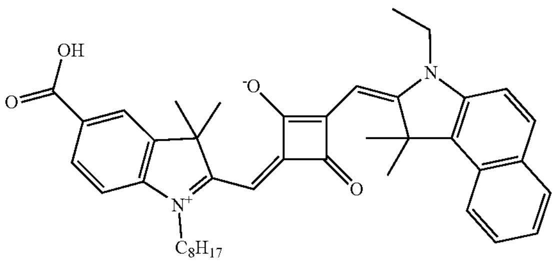

Comparative Example 1-2

A $TiO_2$ electrode was manufactured in the same manner as in Example 1-1, except that dye adsorption was omitted when a $TiO_2$ electrode composed of a $TiO_2$ layer on FTO glass was manufactured.

Example 2-1: Manufacture of Carbon Electrode

A mixed solution (manufacturer: American Radioisotope Chemicals, product name: Citric acid [1,5-14C]) containing an organic acid represented by Chemical Formula 1-1 below composed of $^{14}C$, which is a radioisotope, and a solvent (ethanol:water=1:9 in volume ratio) was prepared.

[Chemical Formula 1-1]

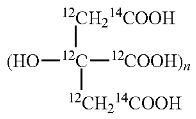

In Chemical Formula 1-1, n is 1, and $^{14}C$ represents a radioisotope of carbon.

Next, 1 ml of aqueous ammonia was added to 10 ml of the mixed solution, followed by stirring to obtain a carbon precursor solution.

Next, 0.3 ml of the carbon precursor solution was dropped dropwise onto the top of FTO glass having a hole having a diameter of 0.75 mm.

Next, the FTO glass was put on a hot plate, followed by drying at 80° C. Then, the FTO glass was put into an electric furnace, followed by firing at 200° C. for 3 hours. Then, a carbon quantum dot layer composed of carbon ($^{14}C$) quantum dots was formed on top of the fired FTO glass.

Next, in the same manner as above, 0.3 ml of the carbon precursor solution was dropped dropwise onto the carbon quantum dot layer. Then, drying and firing were performed 4 times to manufacture a carbon electrode including the carbon quantum dot layer composed of carbon ($^{14}C$) quantum dots.

Comparative Example 2-1

A carbon electrode including a carbon quantum dot layer composed of carbon ($^{14}C$) quantum dots was manufactured in the same manner as in Example 2-1, except that a citric acid-containing solution (manufacturer: Sigma Aldrich, product name: Citric acid) composed of $^{12}C$ was used instead of citric acid composed of $^{14}C$, a radioisotope, to manufacture a carbon electrode.

Experimental Example 1: FE-SEM and FE-TEM Analysis

High-resolution transmission electron microscope (FE-TEM) analysis was performed on the carbon electrode manufactured in Example 2, and the results are shown in FIGS. 4A to 4D.

FIG. 4A is an image of the surface of FTO glass before formation of a carbon quantum dot layer, and FIG. 4B is an image of the surface of the carbon quantum dot layer. In addition, FIG. 4C is an FE-TEM image of the surface of the carbon quantum dot layer. As shown in FIG. 4C, it can be confirmed that carbon quantum dots are formed, and the carbon quantum dots have a diameter of about 5.76 nm.

In addition, FIG. 4D is an image obtained at a higher magnification than that of the image of FIG. 4C. As shown in FIG. 4D, it can be confirmed that the lattice structure spacing between the particles is 0.21 nm, which corresponds to the (100) plane of graphene.

Experimental Example 2: XRD Analysis and Raman Analysis

X-ray diffraction (XRD) analysis and Raman analysis of the carbon electrode manufactured in Example 2 were performed, and the results are shown in FIGS. 5A and 5B, respectively.

XRD analysis was performed under the condition of 2 theta=10° to 80° using an X-ray diffractometer (Panalytical, Empyrean) operating at 40 kV and 30 mA with Cu kλ ray (λ=1.54 Å), and Raman analysis was performed using a NICOLET ALMECA XR Raman spectrometer equipped with a 532 nm wavelength He—Ne laser as a light source.

Referring to the XRD analysis results of FIG. 5A, it can be confirmed that the carbon electrode has the (002), (100) structures of hexagonal graphite.

In addition, referring to the Raman analysis results of FIG. 5B, the peaks of sp3 (Dband) and sp2 are confirmed, and a graphite structure and a peak of defect substitution are confirmed. Based on these results, it can be confirmed that the carbon electrode has a hexagonal graphite structure.

Experimental Example 3: XPS Analysis

X-ray photoelectron spectroscopy (XPS) analysis was performed on the carbon quantum dot layer of the carbon electrode manufactured in Example 2-1, and the results are shown in FIGS. 6A to 6D.

As shown in FIG. 6A, it can be confirmed that carbon, nitrogen, and oxygen are present in the carbon quantum dot layer, indicating that nitrogen doping and various groups exist in carbon quantum dots.

In addition, in FIG. 6B, the main peaks of C Is were corrected for energy values based on C—C 284.5 eV. As shown FIG. 6B, it can be confirmed that the values of the different peaks have C—N, C—O, and C═O bonds, respectively. In addition, as shown in FIG. 6C, in N 1s, a C—N bond was formed by ammonia used during synthesis. As shown in FIG. 6D, in O 1s, C—O and C—O bonds were confirmed.

Based on these results, it can be confirmed that the quantum dot layer of the carbon electrode includes a fired product (carbide) obtained by firing (carbonizing) a polymer of the compound represented by Chemical Formula 2 and ammonium ions ($NH_4^+$).

[Chemical Formula 2]

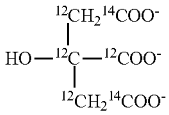

In Chemical Formula 2, $^{14}C$ represents a radioisotope of carbon.

Manufacture Example 1: Manufacture of Betavoltaic Battery

The dye-adsorbed $TiO_2$ electrode manufactured in Example 1-1 was used as an anode, and the carbon ($^{14}C$) electrode manufactured in Example 2-1 was used as a cathode.

Next, surlyn as an encapsulant was uniformly applied to the upper edge of the $TiO_2$ layer of the $TiO_2$ electrode, and the carbon electrode was laminated thereon so that the quantum dot layer of the carbon electrode faced the $TiO_2$ layer.

Next, while heating a hot plate, pressure was applied to the laminate to bond the $TiO_2$ electrode and the carbon electrode.

Next, an $I/I_3$-organic solvent-based electrolyte as an electrolyte was injected, and then the hole was covered with surlyn and cover glass, thereby manufacturing a betavoltaic battery.

Manufacture Example 2 and Comparative Manufacture Examples 1 to 7

A betavoltaic battery was manufactured in the same manner as in Manufacture Example 1, except that different anodes and cathodes as shown in Table 2 were used when manufacturing the betavoltaic batteries of Manufacture Example 2 and Comparative Manufacture Examples 1 to 7.

TABLE 2

| Classification | Anode | Cathode |
|---|---|---|
| Manufacture Example 1 | Example 1-1 (Chemical Formula 3) | Example 2-1 ($^{14}C$) |
| Manufacture Example 2 | Example 1-2 (Chemical Formula 4) | Example 2-1 ($^{14}C$) |
| Comparative Manufacture Example 1 | Comparative Example 1-1 (Chemical Formula 5) | Example 2-1 ($^{14}C$) |
| Comparative Manufacture Example 2 | Example 1-1 (Chemical Formula 3) | Comparative Example 2-1 ($^{12}C$) |
| Comparative Manufacture Example 3 | Example 1-2 (Chemical Formula 4) | Comparative Example 2-1 ($^{12}C$) |
| Comparative Manufacture Example 4 | Comparative Example 1-1 (Chemical Formula 5) | Comparative Example 2-1 ($^{12}C$) |
| Comparative Manufacture Example 5 | Comparative Example 1-2 (without dye) | Comparative Example 2-1 ($^{12}C$) |
| Comparative Manufacture Example 6 | Example 1-1 (Chemical Formula 3) | Comparative Example 2-1 ($^{12}C$) |
| Comparative Manufacture Example 7 | Comparative Example 1-2 (without dye) | Example 2-1 ($^{14}C$) |

Experimental Example 4: Measurement of Structural Stability and Efficiency of Battery Using $^{12}C$ Cathode Electrode According to Dye (1) Solar simulations were performed for the batteries of Comparative Manufacture Examples 2 to 4, and the results are shown in FIG. 7A.

When performing the solar simulations, electric wire was directly connected to the batteries, and the experiments were conducted under 1 sun condition.

As shown in FIG. 7A, it can be confirmed that, when using a ruthenium-based dye-adsorbed $TiO_2$ layer as an anode, a larger amount of current and power are obtained. These results show that the battery has a stable structure and is capable of being driven.

(2) Separately, the properties of the betavoltaic batteries manufactured in Manufacture Examples 1 and 2 and Comparative Manufacture Example 1 were measured using a measuring instrument (keithyl), and the results are shown in FIG. 7B.

As shown in FIG. 7B, it can be confirmed that power density values are different depending on the type of dye of the anode. In addition, it can be confirmed that Manufacture Examples 1 and 2 using a Ru-based dye exhibit higher betavoltaic battery efficiency than Comparative Manufacture Example 1 using an anode including an organic dye.

(3) Difference in betavoltaic battery efficiency due to difference in the dye adsorbed in the $TiO_2$ layer of the anode is due to the metal-ligand charge transfer (MLCT) effect, in which electrons are excited from a metal due to beta electron collision, and the excited electrons move to ligands to increase electron transport power.

More specifically, FIGS. 7C and 7D are schematic diagrams for electron transfer mechanism and band alignment of betavoltaic batteries, the FIG. 7C shows a betavoltaic battery using an anode including an Ru-based dye, and the FIG. 7D shows a betavoltaic battery using an anode including an organic dye.

Electrons excited by collision of beta electrons emitted from a quantum dot layer, which is the beta-ray source emission layer of a cathode, transfer charges from ruthenium metal ions ($\pi \rightarrow \pi^*$) to ligands through a metal-ligand charge transfer (MLCT) process. Then, electrons transferred by deprotonation of —COOH are transferred to a $TiO_2$ electrode by the transferred electrons. As a result, smooth electron transfer is achieved (see FIG. 7C).

Experimental Example 5: Measurement of Electrical Properties

The electrical properties of each of the betavoltaic batteries manufactured in Manufacture Example 1 and Comparative Manufacture Examples 5 to 7 were measured. Current density ($J_{sc}$, short-circuit current density)-voltage ($V_{oc}$, open-circuit voltage) measurement results are shown in FIGS. 8A and 8B, and power density-voltage ($V_{oc}$, open-circuit voltage) measurement results are shown in FIG. 8C.

When measuring electrical properties, a measuring instrument and a betavoltaic battery were connected using wires. Then, in the absence of light, current generated when voltage difference occurred was measured.

The results of measuring electrical properties are shown in Table 3, and the betavoltaic battery efficiency of Manufacture Example 1 was calculated by Equation 1 below.

[Equation 1]

$$\eta = \frac{P_{max}}{P_{source}} \times 100\% = \frac{I_{sc} \times V_{oc} \times FF}{(3.7 \times 10^7) \times \phi \times E_{avg} \times e} \times 100\% =$$

$$\frac{(5.10\text{ nA} \times 29.2\text{mV} \times 0.0255)}{(3.7 \times 10^7 Bq/mCl)(1\text{ Decay}/Bq \cdot s)(0.02727 mCl)(49.4\text{ keV/Decay})(1.6 \times 10^{-19} C)} \times 100\% =$$

$$\frac{5.10\text{ nA} \times \{1e/(1.60 \times 10^{-19} C)\} \times \{(1.60 \times 10^{-19} C)/1e\} \times 29.2\text{ mV} \times 0.255}{1.0090 \times 10^6 \text{Decay}/s) \times (7.904 \times 10^{-15} J/\text{Decay})} \times 100\% =$$

$$\frac{(3.1875 \times 10^{10} \text{electron}/s) \times (11.914 \times 10^{-22} J/\text{electron})}{(1.0090 \times 10^6\text{ electron}/s) \times (7.904 \times 10^{-15} J/\text{electron})} \times 100\% =$$

$$\frac{0.038\, nW}{7.975\, nW} \times 100\% = 0.48\%$$

In Equation 1, $P_{max}$ represents the maximum output power of a betavoltaic device (W), $P_{source}$ represents the radiation power of a $^{14}C$ source (W), FF represents a fill factor, $V_{oc}$ represents open circuit voltage (V), $I_{sc}$ represents short circuit current (A), Ψ represents source activity (Ci), 1 Ci=3.7×10$^{10}$ Bq=3.7×10$^{10}$ decay/s, $E_{avg}$ represents the average beta energy of an isotope (eV/decay), and e represents electron charge (C).

TABLE 3

| Betavoltaic batteries | $V_{oc}$ (mV) | $I_{sc}$ (nA) | Power density (nW/cm$^2$) | Fill factor (FF) | Efficiency of betavoltaic battery (η %) |
|---|---|---|---|---|---|
| Comparative Manufacture Example 5 | 5.15 | 0.839 | — | 0.237 | — |
| Comparative Manufacture Example 6 | 2.91 | 0.445 | — | 0.267 | — |
| Comparative Manufacture Example 7 | 3.34 | 1.14 | 0.000225 | 0.226 | 0.001 |
| Manufacture Example 1 | 29.2 | 5.1 | 0.095 | 0.255 | 0.48 |

Referring to the electrical properties measurement results of Table 3 and FIGS. 8A to 8C, in the case of Manufacture Example 1, it can be seen that the betavoltaic battery is capable of being operated without sunlight.

Experimental Example 6: Measurement of Operational Stability of Betavoltaic Battery The operational stability of the betavoltaic battery of Manufacture Example 1 was measured, and the results are shown in FIGS. 9A and 9B. $V_{oc}$, $I_{sc}$, and the efficiency of the betavoltaic battery were measured in the same manner as in Experimental Example 5. Change in electrical properties according to operation of the betavoltaic battery was measured every 10 minutes for 700 minutes.

As shown in FIGS. 9A and 9B, in terms of electrical properties, an average $I_{sc}$ of about 5.10 nA and an average $V_{oc}$ of about 29.2 mV were observed for 10 hours. In addition, due to irregular emission of beta electrons, constant efficiency within a range of about 0.45 to 0.55% was exhibited.

In addition, the temperature of the betavoltaic battery was constant for 700 minutes. When comparing efficiency at the time of about 600 minutes and at the time of 700 minutes, the efficiency at the time of 700 minutes decreased by about 17% compared to the efficiency at the time of 600 minutes.

Based on the above examples and experimental examples, when the carbon electrode including $^{14}C$ quantum dots of the present invention is used as a cathode, a betavoltaic battery having high efficiency and excellent stability may be provided.

The invention claimed is:

1. A carbon electrode for betavoltaic batteries, comprising:

a support layer comprising a conductive substrate; and a beta-ray source emission layer comprising organic carbon quantum dots comprising $^{14}C$ formed on the support layer, wherein the organic carbon quantum dots comprising $^{14}C$ comprise a fired product obtained by firing a polymer of a compound represented by Chemical Formula 2 below and quaternary ammonium ions:

[Chemical Formula 2]

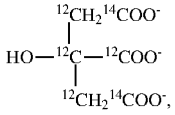

wherein $^{14}C$ represents a radioisotope of carbon.

2. The carbon electrode for betavoltaic batteries according to claim 1, wherein the conductive substrate comprises one or more selected from fluorine tin oxide (FTO) glass, indium tin oxide (ITO) glass, indium zinc oxide (IZO) glass, aluminum zinc oxide (AZO) glass, and gallium zinc oxide (GZO) glass.

3. The carbon electrode for betavoltaic batteries according to claim 1, wherein the organic carbon quantum dots have a particle diameter of 4 nm to 20 nm.

4. A betavoltaic battery, comprising the carbon electrode for betavoltaic batteries according to claim 1 as a cathode.

5. A betavoltaic battery, comprising:

an anode;

a cathode disposed opposite the anode; and an electrolyte, wherein the anode and the cathode are bonded via an encapsulant, a space filled with the electrolyte is formed between the anode and the cathode, the space is filled with the electrolyte, and the cathode comprises the carbon electrode for betavoltaic batteries according to claim 1.

6. The betavoltaic battery according to claim 5, wherein the anode comprises the support layer comprising the conductive substrate; and a $TiO_2$ layer onto which a ruthenium-based dye is adsorbed formed on one surface of the support layer.

7. The betavoltaic battery according to claim 6, wherein the $TiO_2$ layer onto which a ruthenium-based dye is adsorbed has an average thickness of 2 μm to 25 μm.

8. The betavoltaic battery according to claim 6, wherein the ruthenium-based dye is represented by Chemical Formula 3 or Chemical Formula 4:
[Chemical Formula 3]
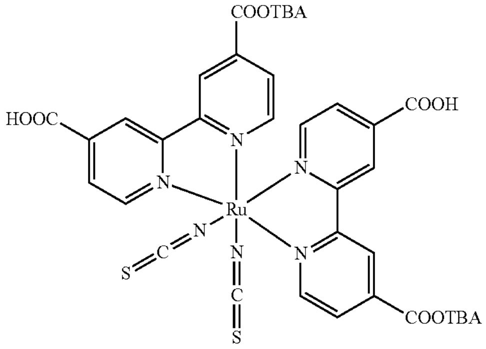
-continued
[Chemical Formula 4]
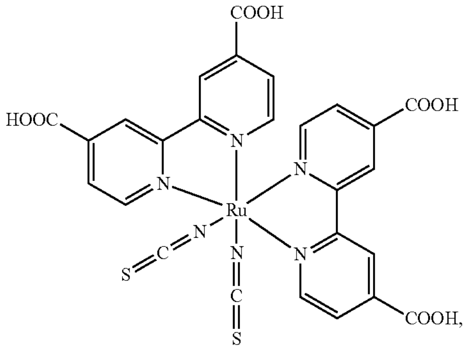
wherein
COOTBA is a carboxylic acid group substituted with a tert-buty-alcohol group.
* * * * *